(12) United States Patent
Sagatun et al.

(10) Patent No.: US 7,278,543 B2
(45) Date of Patent: Oct. 9, 2007

(54) DEVICE FOR SEPARATING MULTI-PHASE FLUIDS

(75) Inventors: Svein Ivar Sagatun, Bønes (NO); Per Eivind Gramme, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 32 days.

(21) Appl. No.: 10/524,032

(22) PCT Filed: Aug. 29, 2003

(86) PCT No.: PCT/NO03/00301

§ 371 (c)(1),
(2), (4) Date: Aug. 19, 2005

(87) PCT Pub. No.: WO2004/022198

PCT Pub. Date: Mar. 18, 2004

(65) Prior Publication Data

US 2006/0102559 A1    May 18, 2006

(30) Foreign Application Priority Data

Sep. 9, 2002    (NO) .................................. 20024316

(51) Int. Cl.
*B01D 17/025* (2006.01)
(52) U.S. Cl. ...................... 210/519; 210/539; 210/540; 96/184

(58) Field of Classification Search ................. 210/519, 210/537, 532.1, 538, 539, 540; 96/182, 183, 96/184
See application file for complete search history.

(56) References Cited

U.S. PATENT DOCUMENTS

| | | | | | |
|---|---|---|---|---|---|
| 1,559,115 | A | * | 10/1925 | Marker et al. ................. | 96/184 |
| 2,206,835 | A | * | 7/1940 | Combs ........................ | 210/540 |
| 2,610,697 | A | * | 9/1952 | Lovelady et al. ............. | 96/189 |
| 4,938,878 | A | * | 7/1990 | Hall ............................ | 210/540 |
| 5,204,000 | A | * | 4/1993 | Steadman et al. ........... | 210/538 |
| 5,326,474 | A | * | 7/1994 | Adams et al. ............... | 210/540 |
| 5,415,776 | A | * | 5/1995 | Homan ........................ | 210/519 |
| 5,695,655 | A | | 12/1997 | Smati | |
| 5,837,152 | A | * | 11/1998 | Komistek et al. ............ | 210/519 |
| 6,537,458 | B1 | * | 3/2003 | Polderman ................... | 210/539 |
| 6,983,852 | B2 | * | 1/2006 | Hemstock et al. ........... | 210/539 |

FOREIGN PATENT DOCUMENTS

| | | |
|---|---|---|
| EP | 1044711 | 10/2000 |
| WO | 9841304 | 9/1998 |

* cited by examiner

*Primary Examiner*—Christopher Upton
(74) *Attorney, Agent, or Firm*—Wenderoth, Lind & Ponack, L.L.P.

(57) ABSTRACT

A device in connection with a separator for separation of a multiphase fluid, including a preferably cylindrical container (1) with an inlet (2), a first outlet (3) for liquid with a higher gravity (for example water), a second outlet (4) for liquid with a lower gravity (for example oil) and a third outlet (5) for gas. A pipe separator (6) is connected to the inlet (2) of the container (1). The pipe separator (6) constitutes a continuation of a supply pipe (7) for supplying the fluid to be separated and extends partially into the container (1).

5 Claims, 1 Drawing Sheet

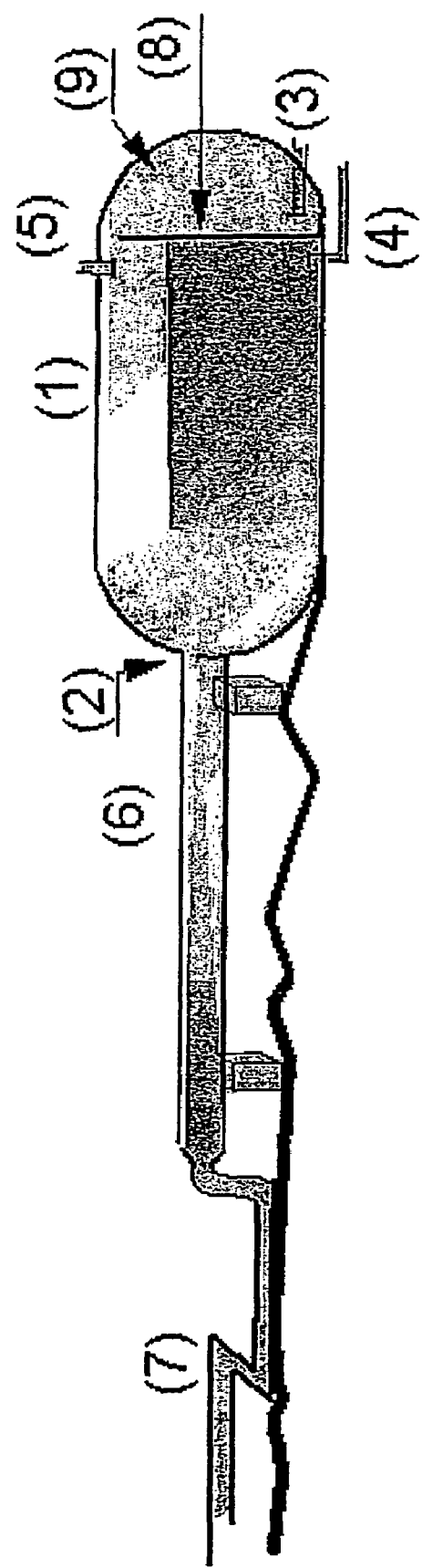

DEVICE FOR SEPARATING MULTI-PHASE FLUIDS

BACKGROUND OF THE INVENTION

1. Field of the Invention

The present invention concerns a device in connection with a separator for separation of a multiphase fluid, comprising a preferably cylindrical container with an inlet, a first outlet for liquid with a higher gravity (for example water), a second outlet for liquid with a lower gravity (for example oil) and a third outlet for gas.

2. Description of the Related Art

The prior art contains gravitation separators of the above type for separation of fluids such as oil, water and gas which are used in a number of contexts in process plants on platforms and production ships or on the sea bed. However, depending on their capacity, such separators are large and heavy and require a lot of space.

The prior art also contains a new type of separator, called a pipe separator, that has been developed by the applicant of the present application and is based on separation in a pipe by means of laminar flow of the separable fluid in the pipe. This type of separator is very effective, requires little space and can be used at great depths of the sea. EP 0977621 shows and describes this type of separator.

SUMMARY OF THE INVENTION

The present invention represents a separator solution based on a combination of the above two separator principles in which additional, more effective separation of the fluid to be separated is achieved.

The present invention is characterized in that a pipe separator is connected to the inlet of the container. The pipe separator constitutes a continuation of the supply pipe for the fluid to be separated and is connected to or extends partially into the container.

By first partially separating the incoming fluid flow in the pipe separator before the further separation in the container, the separation process is optimized, thus achieving better performance and a reduced necessary separator volume.

BRIEF DESCRIPTION OF THE DRAWING FIGURE

The present invention will be described in further detail in the following by means of examples and with reference to the attached FIGURE, which shows an elementary diagram of the present invention.

DETAILED DESCRIPTION OF THE INVENTION

As the FIGURE shows, the present invention comprises a conventional gravitation separator 1, comprising a preferably cylindrical container with an inlet 2, a first outlet 3 for liquid with a higher gravity (for example water), a second outlet 4 for liquid with a lower gravity (for example oil) and a third outlet 5 for gas.

At the end of the container 1, a partition 8 is arranged expediently. It extends towards the upper end of the container and forms a threshold for liquid with a lower gravity (oil) to flow over to a chamber 9 on the right side of the container 1, where the second outlet 4 is arranged.

The special feature of the solution in accordance with the present invention is that a pipe separator 6 is connected to the inlet 2 for the conventional gravitation separator 1. The pipe separator 6 constitutes a continuation of a supply pipe 7 for the fluid to be separated and extends partially into the gravitation separator 1. The pipe separator 6 has a diameter that is greater than the diameter of the supply pipe 7 and is large enough for stratified flow to be achieved. The pipe separator is mainly arranged horizontally, which is also a condition for stratified flow. The requirement for horizontality depends on the flow speed, i.e. the faster the flow, the greater the requirement for horizontality. Moreover, the requirement for horizontality for the pipe separator will depend on separated and extends partially into the gravitation separator 1. The pipe separator 6 has a diameter that is greater than the diameter of the supply pipe 7 and is large enough for stratified flow to be achieved. The pipe separator is mainly arranged horizontally, which is also a condition for stratified flow. The requirement for horizontality depends on the flow speed, i.e. the faster the flow, the greater the requirement for horizontality. Moreover, the requirement for horizontality for the pipe separator will depend on whether the flow is two-phase or three phase. Three-phase flow will have a greater requirement for horizontality for the pipe separator 6.

The solution shown in FIGURE is a separator for oil, water and possibly gas, i.e. a three-phrase separator, with water-continuous inflow. With water-continuous inflow, it is advantageous for the inlet 2 to be arranged so that the outlet from the pipe separator 6 extends into the conventional separator 1 at a level that requires the fluid to arrive in the separator in the water layer (water phase) in the separator. Conversely, it is expedient for the inlet to be arranged so that the inflow enters the oil phase in the separator 1 with oil-continuous inflow.

The two liquid phases (oil/water) that flow into the pipe separator 6 will gradually be separated as they flow through the pipe separator 6 so that oil/water layers will gradually be formed with average drop sizes that, at the inlet to the conventional separator 1, are considerably larger than if no pipe separator had been used. This results in the further separation in the conventional separator being considerably faster and the conventional separator can be made much smaller.

The gas will be separated out much faster than the oil/water separation as the gravity of the gas is much lower than that of the two liquids. This means that the gas/gas bubbles, when they reach the container 1, will rapidly rise to the surface of the liquid and thus constitute a gas phase on the top of the surface of the liquid in the container and will be transported away from there via the gas outlet 5.

The inlet of the pipe separator may expediently be fitted with a device (not shown) to damp the input pulse of the inflowing multiphase flow.

The transition between the pipe separator 6 and the conventional separator 1 should be designed so as to generate minimum shear forces in the flow. This is achieved by using smooth pipes with minimum bending radius (preferably none at all).

The inlet of the pipe separator may expediently be fitted with a device (not shown) to damp the input pulse of the inflowing multiphase flow.

The present invention as it is defined in the claims of the present application is not limited to the example shown in the attached FIGURE and described above. The present invention may, therefore, be used to separate fluids other than oil, gas and water.

The invention claimed is:

1. A device for separating of a multiphase fluid, the device comprising:
   a substantially horizontally oriented cylindrical container having an inlet at one end, a first outlet for liquid with a higher specific gravity, a second outlet for liquid with a lower specific gravity relative to the first liquid, and a third outlet for gas;
   a substantially horizontally oriented pipe separator disposed upstream of the container and connected to the inlet of the container; and
   a supply pipe disposed upstream of the pipe separator for supplying the multiphase fluid to the pipe separator, wherein the supply pipe is connected to an inlet end of the pipe separator wherein the pipe separator has a greater diameter than the supply pipe and the container has a greater diameter than the pipe separator.

2. The device as claimed in claim 1, further comprising a source of multiphase fluid including oil, water and gas, and the container inlet is arranged, for water-continuous inflow, at a level in the container that is equivalent to the level of an expected water phase in the container.

3. The device as claimed in claim 1, further comprising a source of multiphase fluid including oil, water and gas, and the container inlet is arranged, for oil-continuous inflow, at a level in the container equivalent to the level of an expected oil phase in the container.

4. The device as claimed in claim 1, wherein the pipe separator extends partially into the container.

5. The device as claimed in claim 4, wherein the container includes a partition and the first outlet is located on one side of the partition, and the second outlet is located on a second side of the partition.

\* \* \* \* \*